Figure 1:
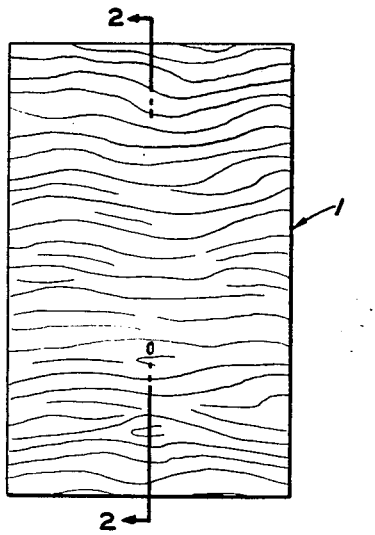

June 20, 1950  N. O. MULAY  2,512,112
PORTLAND CEMENT MIXTURE
Filed June 25, 1948

INVENTOR.
NORMAN O. MULAY
BY
*D. Gordon Angus*
ATTORNEY

Patented June 20, 1950

2,512,112

UNITED STATES PATENT OFFICE 2,512,112

PORTLAND CEMENT MIXTURE

Norman O. Mulay, Pasadena, Calif.

Application June 25, 1948, Serial No. 35,182

1 Claim. (Cl. 106—90)

This invention relates to building materials and more particularly to slabs in the form of shingles.

The principal object of the invention is to provide such a building material which is fireproof, waterproof, heat-insulating and of relatively light weight.

Artificial building materials have heretofore been proposed in various forms and compositions. But they have not been entirely satisfactory for purposes of shingles, as shingles should be of a relatively light weight, in addition to having their other desirable properties.

In accordance with my invention, I provide a slab or shingle of which the material is bound by cement, but which is rendered of a very light weight by the provision of a material adapted to bond readily with the cement and other materials in it to produce the light weight, while still providing a strong construction.

In my novel mixture, I use Portland cement and water to act as the binder in a conventional manner and I use a waterproofing in the mixture. Preferably, the waterproofing material is one which is of the so-called antihydro type; that is, it retards the soaking of water into the substance. I prefer also to incorporate a grease type of waterproofing involving a petroleum jelly or the like.

A novel feature of the mixture is the incorporation in it of substantial amounts of oil shale and volcanic cinders. The oil shale is preferably ground up so that it is mainly a powder, and when so ground it forms a very light powder. The volcanic cinders have the property of relatively light weight, and yet have also the property of being very hard, so that they will not crumble. This results in a tough and strong, but light weight shingle.

An example of a mixture which I have found suitable is as follows, the percentages being by weight:

| | Per cent |
|---|---|
| Cement | 38 |
| Water | 22 |
| Antihydro waterproofing | 7 |
| Grease waterproofing | 1 |
| Volcanic cinders | 9 |
| Oil shale | 23 |

Although the foregoing proportions are eminently suitable for making a shingle, I have found that a considerable variation within reasonable limits is permissible. For example, the cement could be varied from about 20% to 48%; the volcanic cinders could be varied about plus or minus 10% from the value in the table; the oil shale can be varied about plus or minus 15% from the value in the table; the antihydro waterproofing can be varied about plus or minus 1%, and the grease waterproofing can exist in the mixture from 0 to about 1¼%. The permissible variation of water will follow more or less conventional cement practice and will vary somewhat according to the variation of the other substances for the purpose of making a good working mixture.

It may be possible under some circumstances to provide a composition using no waterproofing, although for most purposes the waterproofing will be desired. When the waterproofing is omitted, good relative proportions of the cement, cinders and shale to each other, exclusive of the water, are approximately as follows: Portland cement 54%, volcanic cinders 13%, and oil shale 33%, by weight. When the waterproofing is used, good relative proportions of the waterproofing, cement, cinders and shale to each other would be about: cement 49%; waterproofing 10%; volcanic cinders 11%; oil shale 30%, by weight. These proportions are subject to permissible variations relative to each other, to the same degree as has been indicated in the complete mixture containing the water.

Care should be taken in the manner of mixing in order to provide an even texture. The best way to do this is to mix the volcanic cinders, shale and cement together thoroughly as a dry mixture; and separately to prepare the waterproofing. When the waterproofing is a mixture of grease waterproofing and antihydro waterproofing, they should be mixed together separately. Before mixing the waterproofing with the cinders, shale and cement mixture, the water should be added to the dry mixture of cinders, shale and cement in order to provide a good consistency. Following this, the waterproofing should be added to the wet mixture of cement, shale and cinders; and this total mixture should then thoroughly be mixed. By mixing in this manner, extreme lumpiness is avoided.

The oil shale used in my mixture is in the nature of a ground rock, and is known as "diecreate." It is a shale mined in the Sierra Nevada Mountains in the vicinity of Bishop, California.

The volcanic cinders used in the mixture is a natural volcanic residue found in quantity in the region of extinct volcanoes. Typical locations where this is obtained are in northern California and in Oregon.

The type of waterproofing which is herein called "antihydro" waterproofing is in the nature of a watery liquid which readily permeates the mixture; and it is commonly referred to and bought as "antihydro." The grease waterproofing used in the mixture differs from the antihydro type of waterproofing in that it is like petroleum jelly, or the like; and its use to a limited extent is often desired as it tends to make for a smooth consistency.

This composition can readily be cast while wet, in a manner similar to other cement or concrete mixtures. For example, the mixture may be poured into molds of a proper size and shape and allowed to harden, after which the solid mass may be removed from the mold. The solid composition thus formed is characterized by being relatively light in weight as compared with other cement bonded compositions, and both durable, tough and strong.

Figure 2:
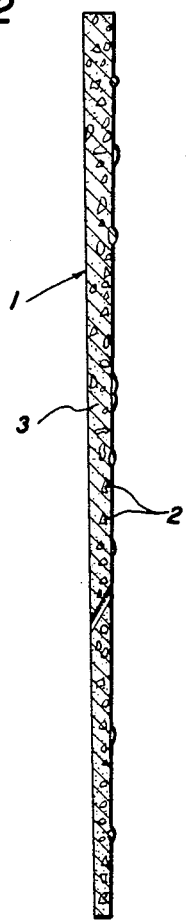

The composition is particularly well adapted for use as building slabs and particularly shingles, as the slab or shingle configuration can readily be molded. Figs. 1 and 2 show such a slab in the shape of a shingle 1, which may be readily formed by pouring the wet mixture in a mold shaped to conform with the shape of the shingle, and allowing the mass to harden. As shown by the cross-section view in Fig. 2, the material of the shingle is composed of rather roundish particles 3 which are the volcanic cinders. These are commonly about the size of small gravel, being approximately an eighth to one-quarter inch in diameter and of somewhat irregular shape. They are hard and tough and, even though of relatively light weight, they will not readily crumble as do ordinary cinders. These larger particles 2 are bound together by a binder 3, comprising the finer grained material, including the cement and powdery oil shale.

Figure 3:
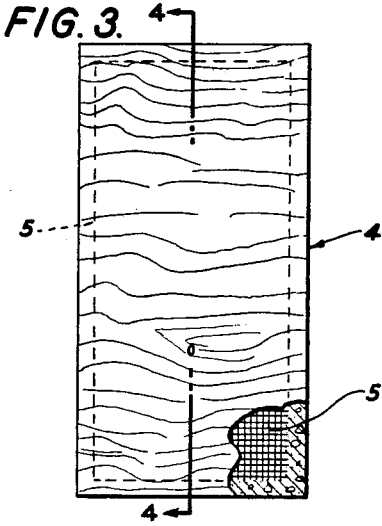
Figure 4:
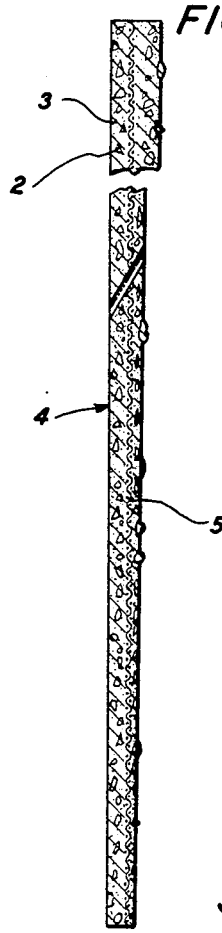

Figs. 3 and 4 show an alternative construction of a shingle 4, which is similar to the shingle 1 in Figs. 1 and 2, except that it contains a reinforcing material 5 which may be in the form of a metallic screening or the like. This reinforcing material is set within the composition while in the mold, and while it is still wet, so that the composition will harden around the reinforcement.

The shingles may vary somewhat in size and shape, and will be proportioned in accordance with the need. Shingles are commonly about 16 inches long in their long dimension, and may vary somewhat in their width. Common widths are, for example, 10 inches, 8 inches and 6 inches, and any of these common, or even other widths may be used. The thickness of a shingle tapers from top to bottom as indicated in the drawing. For example, where the thickness at the thickest edge is ⅝ inch, it may taper down to about ⅜ inch at the thinnest edge; and if a still thicker shingle is desired, it may be made about ¾ inch thick at one edge, and tapered to about ½ inch at the other edge. The particular dimensions of the shingle, however, are of no particular consequence.

It will be recognized that by my invention I have provided a useful and novel composition forming a building material especially useful as slabs or shingles or other shapes which may be desired in construction work. It is notable that there is an absence of sand which is usually found in cement compositions; and the avoidance of sand is especially desirable for my purpose. Sand, if present, would greatly increase the weight beyond that which I wish to have in a shingle.

I claim:

A hardened mixture of Portland cement, volcanic cinders and oil shale in which the proportions are approximately as follows: cement 54%, volcanic cinders 13% and oil shale 33%, by weight.

NORMAN O. MULAY.

No references cited.